Patented Apr. 5, 1927.

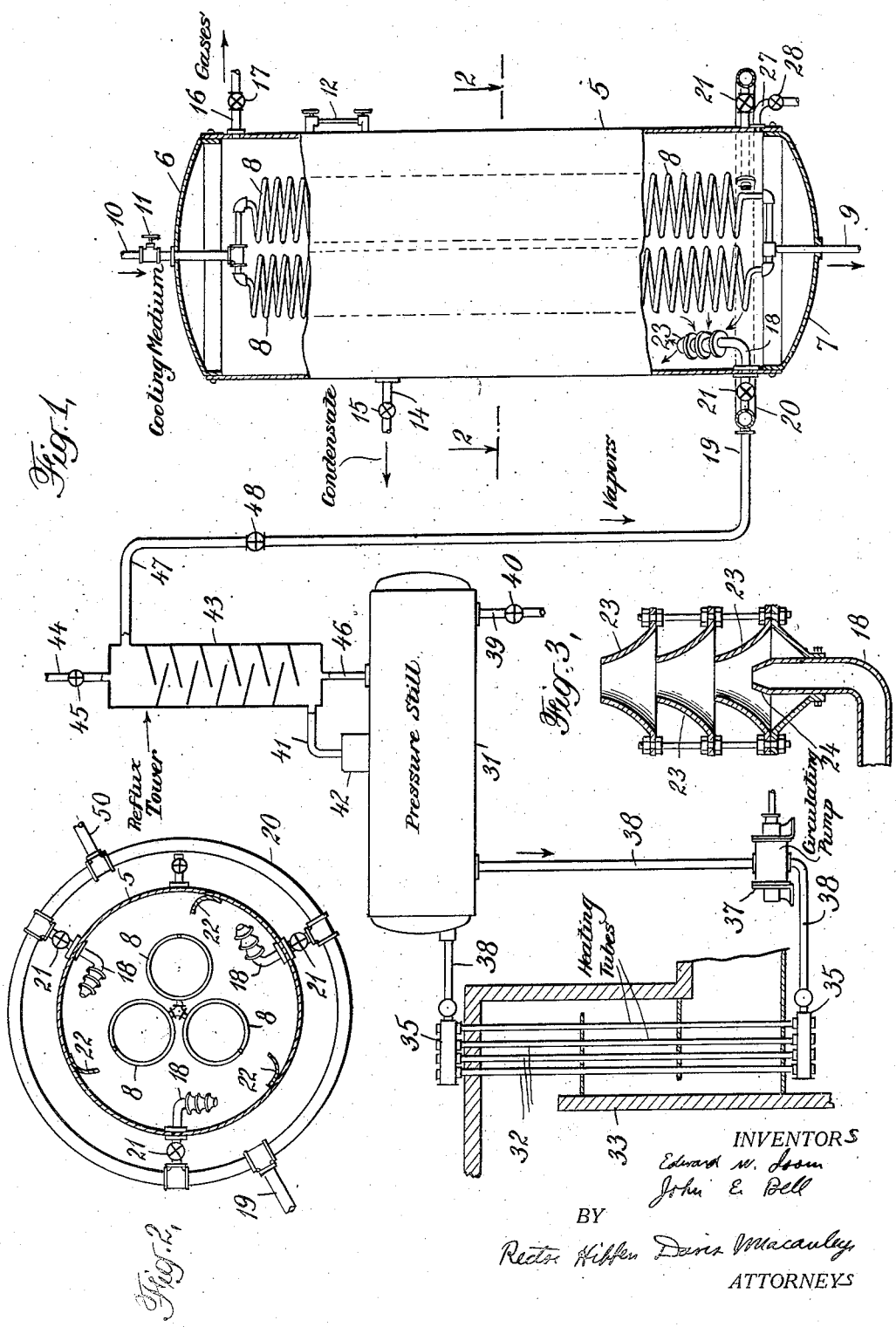

1,623,790

UNITED STATES PATENT OFFICE.

EDWARD W. ISOM, OF WINNETKA, ILLINOIS, AND JOHN E. BELL, OF BROOKLYN, NEW YORK, ASSIGNORS TO SINCLAIR REFINING COMPANY, OF CHICAGO, ILLINOIS, A CORPORATION OF MAINE.

CONDENSATION OF HYDROCARBONS.

Application filed September 10, 1923. Serial No. 661,750.

This invention relates to an improved method for the cooling and condensation of hydrocarbon vapors, and more particularly of hydrocarbon vapors given off during the cracking of petroleum hydrocarbons in pressure stills. This application is in part a continuation of application Serial No. 472,999 filed May 27, 1921. This application has matured into Patent No. 1,575,269.

In the operation of pressure stills, for the cracking of heavier hydrocarbons, the still is maintained under a considerable pressure and the vapors either with or without refluxing, are subjected to cooling and condensation for the recovery of the desired pressure distillate therefrom.

According to the present invention, such hydrocarbon vapors are cooled and condensed by injecting them into a relatively large body of the condensate or pressure distillate produced by the cracking operation; said body of condensate being cooled to absorb and neutralize the heat of condensation, and the vapors being so introduced as to bring about effective agitation of the condensate and intermixture of the vapors therewith, so that the entire body of condensate is maintained at an approximately uniform temperature and so that the vapors and admixed gases are subjected to effective cooling and condensation by intimate admixture with the condensate.

In the practice of the invention, a relatively large body of condensate is provided and maintained as a body into which the vapors to be condensed are introduced, and with which the added condensate from the vapors are mixed; and the vapors are introduced into this condensate in such a way as to promote the condensation and the intimate intermixture of the fresh condensate with the main body of condensate, while the agitated body of condensate is properly cooled to maintain it at the proper temperature. The pressure of the high pressure vapors from the pressure still is utilized for introducing these gases into the body of condensate, and the gases are introduced with an injector action so as to promote the intimate intermixture of the vapors with the condensate. The vapors are, moreover, introduced in such a way as to agitate the entire body of condensate and to prolong the time of contact of the vapors and gases therewith during their upward rise therethrough so that opportunity is given for condensation of substantially all of the condensable vapors, leaving only the unabsorbed permanent gases and a minimum amount of light vapors to escape from the condensing operation.

The temperature of the body of condensate can be regulated by regulating the cooling effect, and this cooling effect may be obtained in various ways, for example, by cooling coils or jackets through which cooling fluids are circulated at proper temperature and in regulated amount to absorb the heat given up by the condensation.

The pressure maintained upon the body of condensate may be atmospheric, or it may be a predetermined pressure above atmospheric but lower than the pressure maintained in the pressure still, so that this pressure is taken advantage of to force the vapors with the desired injector action into the body of condensate and thus promote the condensation, and to agitate the body of condensate to maintain it of approximately uniform temperature.

The condensation of the vapors results in the production of an additional amount of pressure distillate or condensate of the same character as that into which the vapors are introduced and by which they are condensed, so that extraneous liquids are kept from direct contact with the vapors or condensate therefrom. The condensate may be drawn off in proportion to the added amount of pressure distillate condensed, and this withdrawal may be automatically taken care of by a suitable overflow from the condensing apparatus. The fixed gases and any unabsorbed vapors are collected and drawn off to a suitable place of storage or use.

The invention will be further described in connection with the accompanying drawing which shows somewhat diagrammatically and partly in section a suitable apparatus for carrying out the process of the present invention.

In the accompanying drawing,

Fig. 1 is a diagrammatic and partially sectional representation of a pressure still and condensing apparatus capable of operation in accordance with the present invention;

Fig. 2 is a horizontal sectional view taken on the line 2—2 of Fig. 1; and

Fig. 3 is an enlarged sectional view of one of the injector nozzles.

It will be evident that the pressure still may be of different constructions, and the pressure still illustrated is merely for purposes of exemplification. In the cracking of petroleum oils in a pressure still the entire body of cracked vapors may be withdrawn or these vapors may be refluxed under pressure and the reflux returned to the cracking system while only the uncondensed vapors and fixed gases escape to the condenser. The pressure still illustrated is one in which refluxing of the heavier vapors takes place and from which only the lighter vapors, such as are commonly condensed as pressure distillate, are withdrawn to the condenser. The operation of the condenser, however, and the method of cooling and condensation, will be much the same with pressure stills of different constructions and with pressure distillates of varying composition. The condensing apparatus itself which is illustrated in the drawing forms the subject-matter of our companion application, Ser. No. 472,999, filed May 27, 1921.

Referring to the drawings, the tank 5 in which the body of condensate is maintained is a vertical cylinder with closed top and bottom 6 and 7. The means for cooling the condensate consists of a series of coils 8, shown as three in number, and the lower ends of the coils being connected together and to the outlet 9. The upper ends of the coils are likewise connected together and to an inlet connection 10 having valve 11 therein for regulating the flow of cooling liquid. The cooling liquid enters through the inlet pipe 10 and circulates through the cooling coils 8 and escapes through the outlet 9. Preferably, the tank is kept nearly full of condensate, a gauge glass 12 being provided for the purpose of observing the liquid level, and a draw off or overflow pipe 14 having valve 15 therein being provided for drawing off the liquid as it accumulates above the desired height in the tank. The valve 15 may be a hand valve or may be controlled in other suitable manner. A draw-off pipe 16 is provided, having valve 17 therein for drawing off the permanent gases and any uncondensed vapors, the valve 17 permitting the maintenance of the desired pressure in the tank. The valve 17 is shown as a hand valve but it may be regulated otherwise to maintain a predetermined pressure.

Arranged near the bottom of the tank is a series of nozzles shown as three in number and equally spaced about the periphery of the tank. The nozzles are made up of injector pipes 18 with a series of conical deflectors 23 axially arranged over the nozzle and spaced apart by bolts and nuts so that a free passage for the circulation or induction of the liquid condensate is provided between the adjacent deflector plates. The nozzle pipes 18 are connected with the manifold 20 which in turn is supplied with the vapors to be condensed through the pipe 19. Regulating valves 21 permit independent regulation of each of the pipes 18.

The heated vapors entering the tank through the nozzles 24 of the nozzle pipes 18 is projected through the central openings of the deflector cones and draws the liquid condensate by an injector action between the cones so that a thorough and intimate intermixture of the vapors and condensate is obtained.

It will be noted that the injector nozzles are directed in an upwardly inclined direction so as to accomplish a constant rapid circulation and agitation of the condensate. This action is supplemented by inwardly extending baffles 22 vertically arranged so as to cooperate with the inclined nozzles in giving a thorough intermixture of the condensate and vapors and a thorough agitation of the entire body of condensate. The deflectors 22 also serve to direct the condensate and admixed vapors inwardly toward and among the cooling coils where the added heat of condensation is neutralized and absorbed by these coils. An effective circulation of relatively large streams or currents of condensate, and an effective cooling action, are thus obtained.

The pressure still illustrated is of the general construction described in United States Patent 1,285,200, granted to the Sinclair Refining Co. upon an application of Edward W. Isom. This pressure still, which is illustrated in a diagrammatic and conventional manner, comprises the bulk supply tank 31 in which a considerable body of oil is maintained, vertical heating tubes 32 suitably arranged in the heating flue of a furnace 33, pipe connections 38 connecting the bulk supply tank with the headers or manifolds 35 at the ends of the vertical tubes, and a pump 37 for circulating the oil from the bulk supply tank through the heating tubes and back to the bulk supply tank. A tar draw-off is shown at 39 with valve 40 therein.

A reflux tower 43 is arranged above the still and receives the vapors from the dome 42 through the vapor line 41, while the condensed vapors return to the still through the pipe 46. A pipe 44 with regulating valve 45 therein permits the introduction of feed oil to the top of the reflux tower. The vapors which are not condensed and refluxed in the reflux tower and the lighter vaporized constituents of the feed oil, escape from the top of the tower through the vapor line 47, having the pressure regulating and reducing valve 48 therein.

In the operation of such a pressure still the oil is heated by rapid circulation through the heating tubes and the entire body of oil is maintained at a cracking temperature and under high pressure, for example, a pressure of around 90 to 125 lbs. where gas oil is the oil subjected to the cracking operation. although considerably higher pressures may be used, particularly with lighter charging stock for the pressure stills.

The vapors and admixed gases escaping from the still may have their pressure reduced from still pressure to a much lower pressure by means of the valve 48, but it will be evident that any desired pressure between that maintained in the pressure still and atmospheric can be obtained in the pipe 19 and in the condenser, provided this pressure is sufficiently lower than that of the pressure still to force the vapors with a sufficient velocity to obtain the desired injector action on entering the body of liquid condensate. It will be evident that the pressure may be in part regulated by the valves 21 and that a back pressure on the condenser may also be obtained by means of the regulating valve 17 so that condensation will take place under a pressure intermediate atmospheric and that maintained in the pressure still. With the vapors from the still supplied under the necessary pressure and with considerable velocity, and with the injector nozzles arranged as illustrated, it will be evident that a considerable force is available in the vapors for bringing about an injector action and resulting intimate intermixture of the vapors and condensate, while the manner in which the vapors enter the condenser serves to promote effective condensation and circulation of the entire body of condensate.

In the operation of the apparatus the tank 5 is maintained nearly full of condensate so that a relatively large body of condensate is provided into which the vapors are injected and through which they must pass before any uncondensed vapors and gas can escape at the top of the tank. The tank 5 shown in the drawings is not intended to be shown to scale, and, when used with a single pressure still, a tank of smaller relative proportions may be used; or a large tank can be used as a condenser for a plurality of pressure stills as will be readily understood. A connection for one or more additional pressure stills is indicated at 50 in Fig. 2.

The cooling coils may as above noted be supplied with a suitable cooling fluid such as cold water, brine, ammonia, etc., so that the body of condensate will be maintained at a sufficiently low temperature to promote the desired cooling and condensing operation. The amount of cooling agent supplied should be sufficient to neutralize and absorb the heat given up by the vapors on condensing so that the body of condensate will not be raised above that which it is desired to maintain in the condenser.

It will thus be seen that the present invention provides an improved method of condensation of the high temperature and high pressure vapors from pressure stills whereby the pressure of these vapors is utilized to advantage in bringing about an intimate intermixture of the vapors with the condensing liquid; and that the condensing liquid is a large body of condensate or pressure distillate of the same composition as the condensed vapors so that the condensed vapors will admix therewith and a regulated amount of the admixture can be drawn off to maintain the desired level in the condenser. It will also be noted that the introduction of the vapors is effected in an upwardly inclined direction so as to cause a general rotary motion of the body of condensate thus prolonging the path of the vapors and gases as they pass upwardly through the body of condensate, while the rising streams are deflected and brought into intimate contact with the cooling coils and the condensing action thereby further promoted. This condensing action is further promoted by maintaining a considerable back pressure on the condenser and by drawing off the fixed gases and such small amounts of vapors as escape condensation and releasing their pressure after they are withdrawn. The condensing operation is, moreover, carried out in a substantially automatic manner without necessity of providing additional equipment for forcing the vapors into the condenser and with the minimum of attention on the part of the operators.

We claim:

1. The improvement in the condensation and cooling of hot hydrocarbon vapors and gases which comprises injecting the hot vapors and gases into a body of liquid condensate of the vapors, cooling said body of condensate and maintaining a substantially uniform temperature by agitation and circulation thereof maintained by the injection of the hot vapors and gases.

2. The improvement in the condensation of hot hydrocarbon vapors which comprises injecting the hot vapors into a body of liquid condensate thereof, cooling said body of condensate and maintaining circulation of the cooled condensate by the injection of the vapors.

3. The improvement in the condensation and cooling of hot hydrocarbon vapors and gases which comprises injecting the vapors and gases into a body of liquid condensate of the vapors in a plurality of jets, cooling said body of condensate and maintaining circulation in said body by the injection of the vapors and gases.

4. The improvement in the condensation and cooling of hot hydrocarbon vapors and gases which comprises cooling a body of condensate of the vapors, injecting the vapors and gases into the body of cooled liquid condensate in directed streams whereby to secure effective circulation and agitation of said body of condensate.

5. The method of cooling and condensing hot hydrocarbon vapors from pressure stills which comprises maintaining a body of condensate thereof, introducing the vapors from said still into said body of condensate near the lower portion thereof with an injector action, whereby the vapors are intimately admixed with the condensate, cooling the body of condensate, and effecting agitation of the body of condensate by the injection of the vapors therein.

6. The method of cooling and condensing hot hydrocarbon vapors from pressure stills which comprises maintaining a body of condensate thereof in a vertical cylindrical tank, cooling the body of condensate and introducing the vapors therein with an injector action in a direction generally tangential to the walls of the tank, whereby the vapors are brought into intimate contact with the condensate and effective agitation of the body of condensate and prolongation of the path of the vapors therethrough is effected.

7. The method of cooling and condensing hot hydrocarbon vapors from pressure stills which comprises maintaining a body of condensate thereof in a vertical cylindrical tank, cooling the body of condensate and introducing the vapors therein with an injector action in a direction generally tangential to the walls of the tank, whereby the vapors are brought into intimate contact with the condensate and effective agitation of the body of condensate and prolongation of the path of the vapors therethrough is effected, the agitation and condensation being promoted by deflecting the currents of condensate and vapors inwardly toward the center of the body of condensate.

In testimony whereof we affix our signatures.

EDWARD W. ISOM.
JOHN E. BELL.